(12) United States Patent
Kimata

(10) Patent No.: US 7,750,809 B2
(45) Date of Patent: Jul. 6, 2010

(54) INFORMATION MANAGEMENT SYSTEM, METHOD, PROGRAM AND RECORDING MEDIUM

(75) Inventor: Isao Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 484 days.

(21) Appl. No.: 11/728,524

(22) Filed: Mar. 26, 2007

(65) Prior Publication Data

US 2007/0222591 A1   Sep. 27, 2007

(30) Foreign Application Priority Data

Mar. 27, 2006   (JP)   .............................. 2006-086177

(51) Int. Cl.
   *G08B 13/14*   (2006.01)
(52) U.S. Cl. .............. 340/572.1; 340/572.4; 340/572.7; 340/572.8; 340/540; 340/541; 340/10.41; 340/5.61; 340/870.1; 343/806; 343/793; 343/895
(58) Field of Classification Search .............. 340/572.1, 340/572.4, 572.7, 572.8, 540, 541, 10.41, 340/5.61, 870.1; 343/806, 793, 895
   See application file for complete search history.

(56) References Cited

U.S. PATENT DOCUMENTS 6,806,808 B1 *  10/2004  Watters et al. ........... 340/10.41
6,853,347 B2 *   2/2005  Forster et al. ............... 343/806
2004/0113790 A1 *  6/2004  Hamel et al. ............. 340/572.1
2005/0242922 A1 * 11/2005  Sakamoto et al. .......... 340/5.61

FOREIGN PATENT DOCUMENTS

JP     2001-322718      11/2001
JP     2005-222291       8/2005

* cited by examiner

*Primary Examiner*—Tai T Nguyen
(74) *Attorney, Agent, or Firm*—Scully, Scott, Murphy & Presser, P.C.

(57) ABSTRACT

An RF tag includes a sensor for detecting a change in an environment near the RF tag, a storage section for storing identifier information uniquely assigned to each RF tag to identify the RF tag, and a controller for controlling the sensor and the storage section. A reader-writer includes a sensor value requesting section for requesting, with respect to the identifier information, a sensor value detected by the sensor. When the environmental information changes, the reader-writer identifies an object according to the sensor value sent from the RF tag including the identifier information as a response to the reader-writer. It is therefore possible, using an information management system, an information management method, a program, and a recording medium, to recognize an object including a particular tag.

18 Claims, 8 Drawing Sheets

F I G. 4
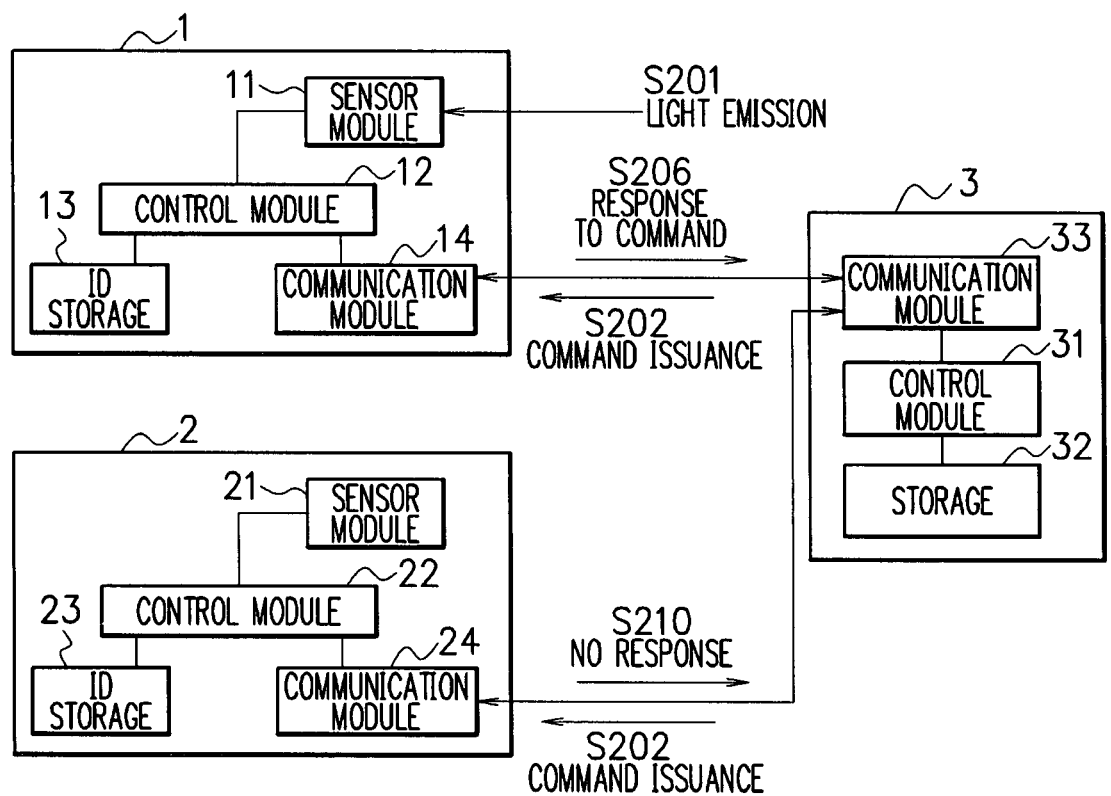

F I G. 5
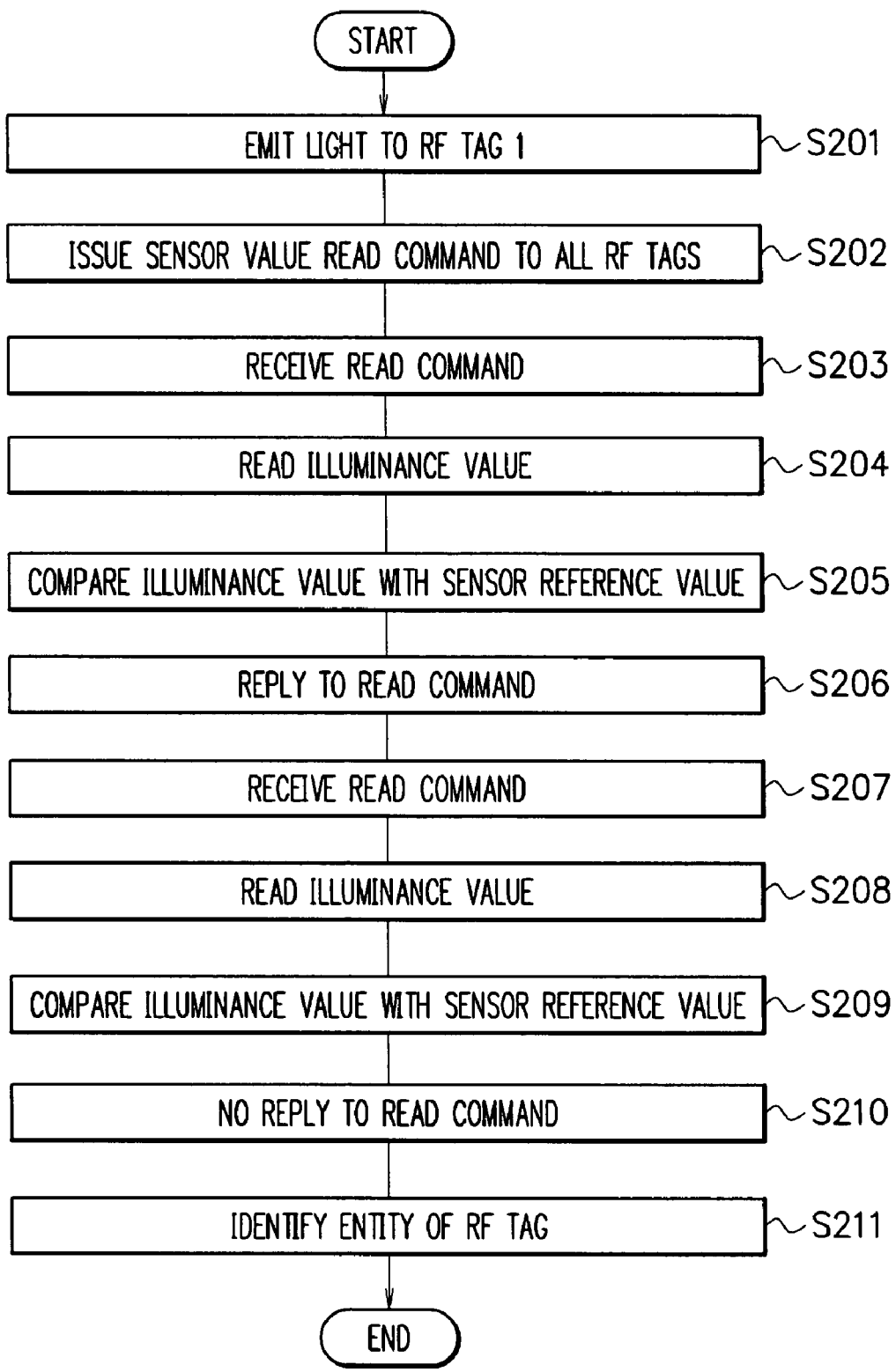

INFORMATION MANAGEMENT SYSTEM, METHOD, PROGRAM AND RECORDING MEDIUM

BACKGROUND OF THE INVENTION

1. Field of the Invention

The present invention relates to an information management system including a radio frequency (RF) tag with a sensor included therein and a reader-writer and an information management method, a program, and a recording medium for use with the information management system.

2. Description of the Related Art

Recently, high-performance RF tags including sensors have been widely used. On the other hand, in a situation where a plurality of RF tags is managed, a user must confirm the correspondence between identifications (ID) of the tags (tag IDs) and actual tags in order to operate only particular RF tags. To deal with the situation, at present, a label on which a tag ID is printed is attached to a tag. As a consequence, work and time for the operation increase in proportion to the number of tags.

To solve the problem, Japanese Patent Application Laid-Open Ser. Nos. 2001-322718 (document 1) and 2005-222291 (document 2) describe techniques as below. According to the technique of document 1, RF ID tags are scanned and tag information items thus obtained are related to positions of tags or tagged items.

In accordance with document 2, there is provided an IC tag attached onto a circuit board such that even if it is difficult to directly touch the circuit board, the user can confirm information on the circuit board. According to the technique, there are provided a failure diagnosing device and a method that diagnose a cause of failure in the circuit board using the IC tag.

In accordance with the conventional techniques, it may be possible to obtain the ID information of RF tags all together. However, when a particular RF tag is selected from a plurality of RF tags, it is difficult to determine the identification (ID) corresponding to an entity of the particular tag.

SUMMARY OF THE INVENTION

It is therefore an objective to provide an information management system employing RF tags each including a sensor, the sensor detecting a change in an environment near the RF tag to recognize an entity of an object including the RF tag by use of the value of the change detected by the sensor and identification information items to identify RF tags, and also to provide an information management method, a program, and a recording medium for use with the information management system.

In accordance with a first aspect of the present embodiments, there is provided an information management system including one or a plurality of radio frequency (RF) tags and a reader-writer, the RF tags and the reader-writer communicating with each other. Each of the RF tags includes a sensor for detecting a change in an environment around the RF tag, a storage section for storing identifier information identifying the RF tag, the information being uniquely assigned to the RF tag, and a first controller for controlling the sensor and the storage section. The reader-writer includes a sensor value requesting section for requesting, with respect to the identifier information, a sensor value detected by the sensor. The reader-writer determines, when the environmental information changes, an object according to the sensor value sent from an RF tag including the identifier information to the reader-writer.

In accordance with a second aspect of the present embodiments, the reader-writer further includes a sensor reference value transmitter for transmitting, in response to a request from the sensor value requester, a sensor reference value. The RF tag includes a first sensor value comparator for comparing the sensor value detected by the sensor with the sensor reference value. The first controller decides, according to a result of the comparison, whether to reply to the reader-writer.

In accordance with a third aspect of the present embodiments, the reader-writer issues, when the request includes the sensor reference value, the request for the sensor value to all RF tags.

In accordance with a fourth aspect of the present embodiments, the reader-writer includes a communication module for communicating information with an external device other than the RF tags and a second controller for controlling the communication module, the sensor value requester, and the sensor reference value transmitter. An object is recognized according to the sensor value for which a request is issued from the external device via the reader-writer with respect to the identifier information and which is sent from the RF tag including the identifier information to the reader-writer.

In accordance with a fifth aspect of the present embodiments, the reader-writer includes a second sensor value comparator for comparing the sensor value with the sensor reference value. The second controller decides, according to a result of the comparison, whether to reply to the external device.

In accordance with a sixth aspect of the present embodiments, the RF tag further includes a sensor value storage section for storing the sensor value, a difference calculator for calculating a difference value between the sensor value before the environment is changed and the sensor value after the environment is changed, and a third sensor value comparator for comparing the difference value with the sensor reference value sent from the reader-writer. The first controller decides, according to a result of the comparison, whether to reply to the reader-writer.

In accordance with a seventh aspect of the present embodiments, there is provided an information management method including one or a plurality of RF tags and a reader-writer, the RF tags and the reader-writer communicating with each other. The method includes the steps of: changing an environment around at least one of the RF tags; detecting a change in the environment by a sensor disposed in the RF tag; requesting by the reader-writer for sensor value detected by sensors in RF tags that are designated with identifier information items; transmitting, in response to a request from the reader-writer, a sensor value from an RF tag possessing the identifier information item.

In accordance with an eighth aspect of the present embodiments, the information management method further includes the steps of: transmitting from the reader-writer a sensor reference value with the request for a sensor value; and comparing, when the RF tag receives the sensor reference value, the sensor value detected by the sensor with the sensor reference value. The method decides, according to a result of the comparison, whether to reply to the reader-writer.

In accordance with a ninth aspect of the present embodiments, the information management method further includes the step of sending the request for the sensor value with the sensor reference value to all RF tags.

In accordance with a tenth aspect of the present embodiments, the information management method further includes the steps of: communicating with an external device other than the RF tags; and controlling communication between the reader-writer and the external device, a procedure of requesting the sensor value, and a procedure of sending the sensor reference value, wherein an object is identified according to the sensor value.

In accordance with an 11th aspect of the present embodiments, the information management method further includes the steps of: comparing the sensor value with the sensor reference value. The necessity for replying to the external device is decided according to a result of the comparison.

In accordance with a 12th aspect of the present embodiments, the information management method further includes the steps of: storing the sensor value in the RF tag; calculating, by the RF tag, a difference value between the sensor value before the environment is changed and the sensor value after the environment is changed; and comparing, by the RF tag, the difference value with the sensor reference value sent from the reader-writer. The necessity for replying to the reader-writer is decided according to a result of the comparison.

In accordance with a 13th aspect of the present embodiments, there is provided a computer program for use with an information system comprising one or a plurality of RF tags and a reader-writer, the RF tags and the reader-writer communicating with each other. The program causes a computer to perform the following: detecting a change in an environment by a sensor disposed in the RF tag; requesting by the reader-writer for a value detected by the sensor in RF tags that are designated with identifier information items; transmitting, in response to a request from the reader-writer, the sensor value from an RF tag; and identifying an object according to an identifier information item and the sensor value.

In accordance with a 14th aspect of the present invention, the program further causes a computer to perform the following: transmitting a sensor reference value with the request for the sensor value from the reader-writer; comparing, when the RF tag receives the sensor reference value, the sensor value with the sensor reference value; and deciding, according to a result of the comparison, whether to reply to the reader-writer.

In accordance with a 15th aspect of the present embodiments, the program further causes a computer to send the request for the sensor value with the sensor reference value to all RF tags.

In accordance with a 16th aspect of the present embodiments, the program further causes a computer to perform the following: communicating with an external device other than the RF tags; controlling communication between the reader-writer and the external device, a procedure of requesting the sensor value, and a procedure of sending the sensor reference value, wherein an object is identified according to the sensor value.

In accordance with a 17th aspect of the present embodiments, the program further causes a computer to perform the following: f comparing the sensor value thus replied with the sensor reference value; deciding whether to reply to the external device according to a result of the comparison.

In accordance with an 18th aspect of the present embodiments, the program further causes a computer to perform the following: storing the sensor value in the RF tag; calculating, by the RF tag, a difference value between the sensor value before the environment is changed and the sensor value after the environment is changed; comparing, by the RF tag, the difference value with the sensor reference value sent from the reader-writer; deciding, according to a result of the comparison, whether to reply to the reader-writer.

In accordance with a 19th aspect of the present embodiments, there is provided a computer-readable recording medium having stored therein a program mentioned in the 13th to 18th aspects.

As described above, in the information management system, the information management method, the program, and the recording medium for use with the information management system in accordance with the present embodiments, a sensor detects a change in an environment around an RF tag disposed on an object such that an identity of the object is recognized by use of the measured values and identifying information items for identifying the RF tags.

BRIEF DESCRIPTION OF THE DRAWINGS

The objectives and features will become more apparent from the consideration of the following detailed description taken in conjunction with the accompanying drawings in which:

FIG. 4 is a block diagram showing a configuration of a second embodiment of an RF tag and an RF tag reader-writer;

FIG. 5 is a flowchart showing operation of the RF tag and the RF tag reader-writer in the second embodiment;

DESCRIPTION OF THE EMBODIMENTS

Figure 1:
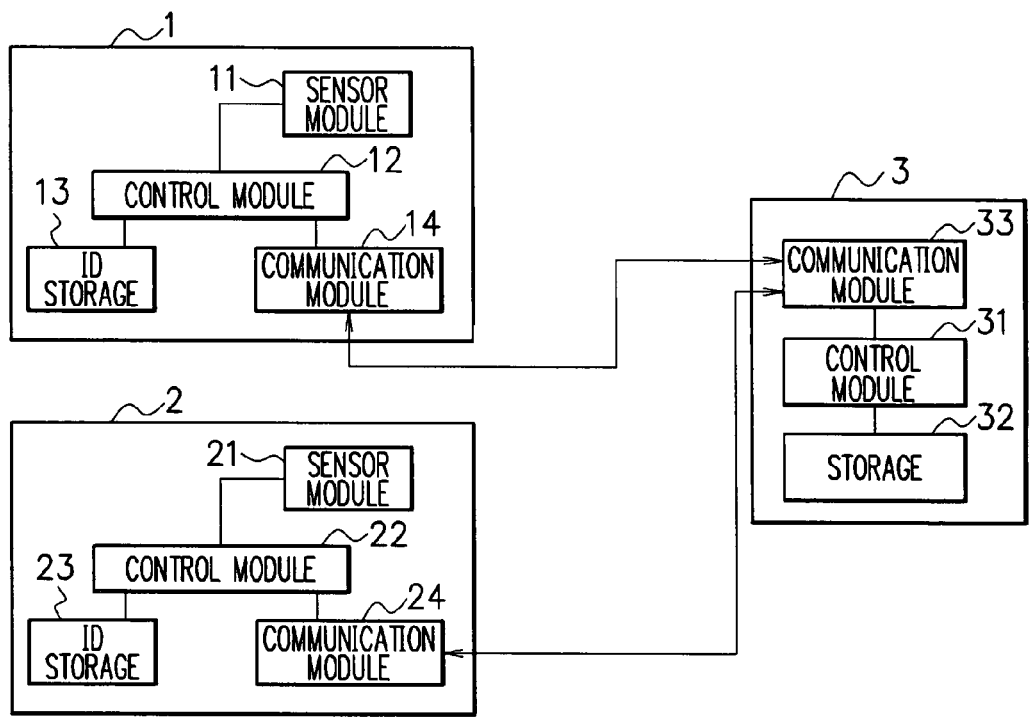
FIG. 1 is a block diagram showing a configuration of an embodiment of an RF tag and an RF tag reader-writer.

According to embodiments, an arbitrary RF tag is selected from a plurality of RF tags each including a sensor. The RF tag is, for example, exposed to a light from an emitting device to change a physical condition (an environment around the sensor) and in consequence the value of the sensor. In this state, a tag ID of each RF tag and the quantity of change in the value of the sensor of the tag are checked. A tag ID paired with the value of the sensor that exceeds a threshold value is identified as the tag ID corresponding to an entity of the tag selected by the operation described above.

Referring to the drawings, description will be given of an information management system, an information management method, a program, and a recording medium for use with the information management system in accordance with embodiments. However, the embodiments are not limited to those described below and hence can be changed and modified in various ways within the scope and spirit of the present invention.

FIG. 1 shows a block diagram of an information management system.

As can be seen from FIG. 1, the information management system includes RF tags 1 and 2, and an RF tag reader-writer 3. The tags 1 and 2 are similar in structure to each other and each thereof includes a sensor. The tag 1 includes a sensor module 11, a control module 12, an ID storage section, and a communication module 14. The tag 2 includes a sensor module 21, a control module 22, an ID storage section, and a communication module 23. Hereinafter, the sensors of the tags 1 and 2 are treated as illuminance sensors.

The sensor modules 11 and 21 are illuminance sensors to detect the value of brightness, i.e., illuminance or luminance around the tags. The sensor also detects the brightness that changes in response to light emitted from a light emitting device. The controllers 12 and 22 control overall operations of the RF tags 1 and 2, respectively. The controllers 12 and 22 receive sensor values detected by the sensor modules 11 and 21. The ID storage sections 13 and 23 store information items unique to the RF tags 1 and 2. The ID storage section 13 beforehand stores the ID of the RF tag 1 (IDa). The ID storage section 23 stores the ID of the RF tag 2 (IDb) in advance. The communication modules 14 and 24 conduct communication with the RF tag reader-writer 3, receive commands from the reader-writer 3 and send replies thereto in response to the commands.

The RF tag reader-writer 3 includes a control module 31, a storage section 32, and a communication module 33. The control module 31 controls the overall operation of the reader-writer 3. For example, the module 31 controls communication between the communication module 33 and the RF tags 1 and 2, and controls operation to store in the storage section 32 sensor values received from the tags 1 and 2. The communication module 33 communicates with the tags 1 and 2.

Although not shown, data to be stored in the storage section 33 of the reader-writer 3 and commands to the tag 1 or 2 may be communicated with an external controller or an external server. Such operation will be described later with reference to FIG. 6.

Description will next be given of the information management system, the information management method, the program, and the recording medium for each of the embodiments.

First Embodiment

Figure 2:
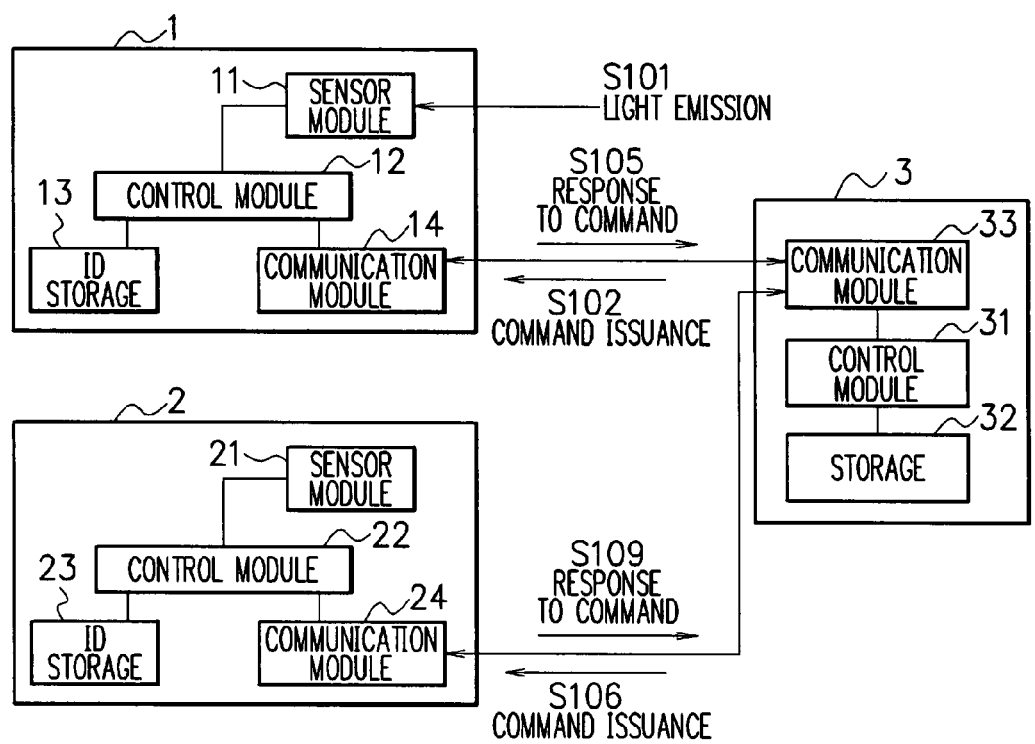
FIG. 2 is a block diagram showing a configuration of a first embodiment of an RF tag and an RF tag reader-writer.
Figure 3:
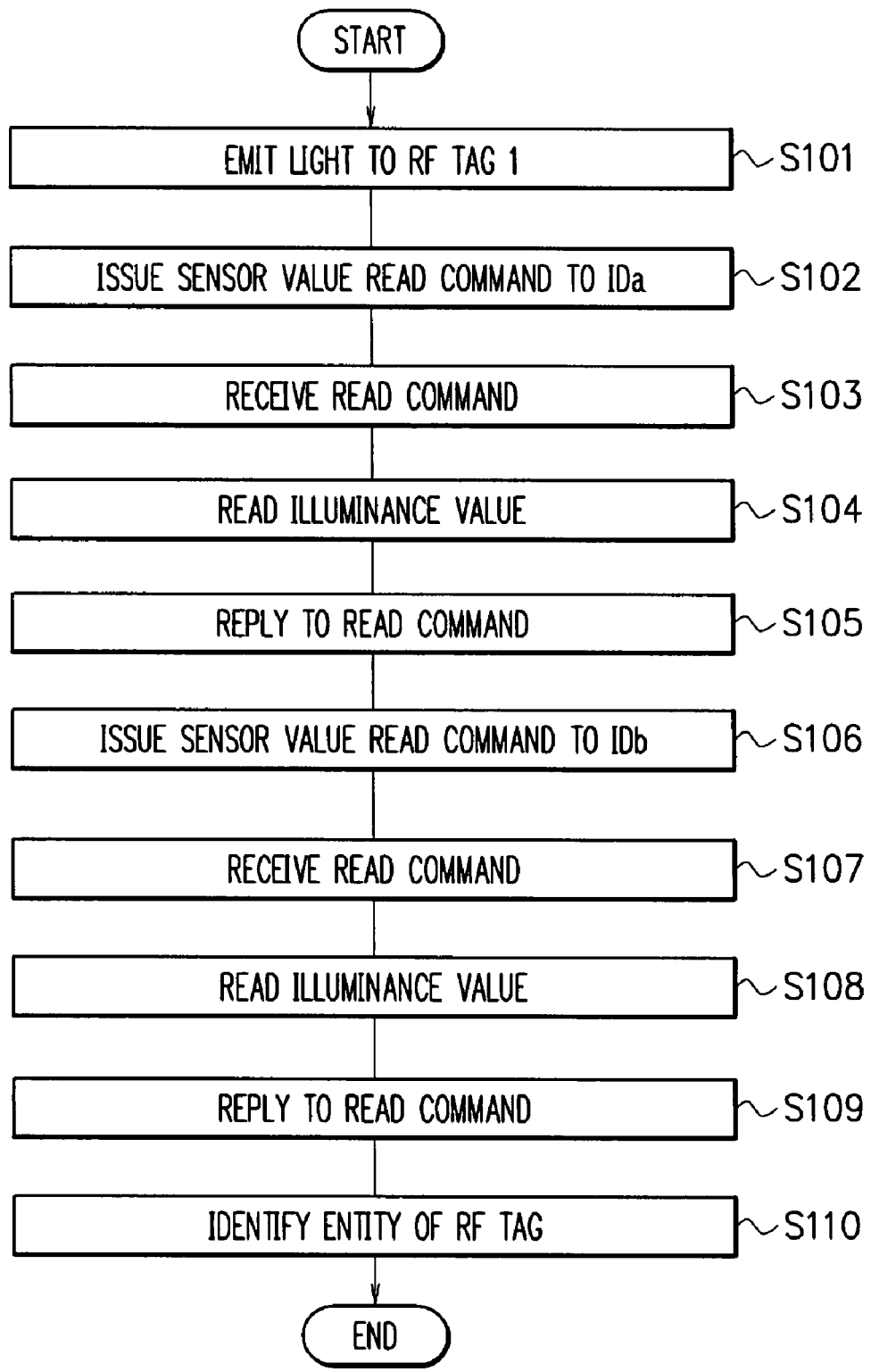
FIG. 3 is a flowchart showing operation of the RF tag and the RF tag reader-writer in the first embodiment.

FIG. 2 is a block diagram to show a structure of a first embodiment of the information management system. FIG. 3 is a flowchart showing an operation of the information management system. In this regard, the step numbers with an arrow in FIG. 2 correspond to the step numbers shown in FIG. 3.

Light is emitted to the RF tag 1 from a light emitting unit (not shown) (step S101). It is assumed that in a state before the light is emitted, the sensor of each RF tag shows an illuminance value (sensor value) less than m. After the light emission to a selected RF tag, the sensor value of the RF tag is equal to or more than m.

After the light emission, the RF tag reader-writer 3 issues a sensor value read command to IDa to read the sensor value (step S102). The communication module 14 of the tag 1 receives the command to send the command to the controller 12 (step S103). When the read command is received, the controller 12 confirms that the unique ID of the tag 1 stored in the ID storage section 13 is IDa, and reads the illuminance value from the sensor module 11 (step S104). The obtained illuminance value is sent as a reply to the read command via the communication module 14 to the reader-writer 3 (step S105).

The operation described above is also conducted for IDb. That is, the reader-writer 3 sends a sensor value read command to IDb to read the sensor value (step S106). The communication module 24 of the tag 2 receives the command to send the command to the controller 22 (step S107). The controller 22 receives the command, confirms that the unique ID of the tag 2 in the ID storage section 23 is IDb, and reads the illuminance value from the sensor 21 (step S108). The illuminance value is delivered as a reply to the read command to the reader-writer 3 (step S109). From the combination of the illuminance values with the unique tag IDs, the entity of the RF tag is identified (step S110).

While the sensor value from the tag 1 in response to the light emission is equal to or more than m, the sensor value from the tag 2 to which light is not emitted is less than m. That is, the illuminance value corresponding to IDa is at least m and the value corresponding to IDb is less than m. According to the combinations of a tag ID and a illuminance value, it is concluded that the entity of the RF tag having IDa as its tag ID is the RF tag 1 which was selected as a target of light emission and to which the light was emitted.

Moreover, if the light emitter selects the tag 2 as the target of light emission, it is also possible to determine that the entity of the RF tag having IDb is the RF tag 2.

In the first embodiment, the combination of a sensor in a tag and an operation of the physical condition is an illuminance sensor and light emission from a light emitter. However, embodiments are not restricted by this combination. Any combination may be employed only if the environment around a RF tag is changed. There may be adopted various combinations of sensor types and physical phenomena that change the values of the sensors. For example, a combination of a temperature sensor and a heat source device, a combination of a wind pressure sensor and a ventilator, and a combination of a pressure sensor and a pressure device may be used. In addition, although two RF tags are disposed in the first embodiment, the number of RF tags is not limited. It is possible to set an arbitrary number of RF tags in the configuration. Diversity of sensor types and physical quantities that are sensed, and an unrestricted number of RF tags also apply to the other embodiments.

In accordance with the first embodiment, when a plurality of RF tags each including a sensor is employed, an entity of a tag corresponding to a tag ID can be easily identified.

Second Embodiment

In a second embodiment, it is possible to decide whether to send a reply in response to a received command described in the first embodiment. A sensor value read command to be issued from a RF tag reader-writer further includes a sensor reference value. A controller in a RF tag compares a sensor value from the sensor module with the sensor reference value in the read command to decide whether a reply is to be made to the read command.

Next, the second embodiment will be described by referring to the drawings.

FIG. 4 shows a block diagram to show a structure of an information management system. FIG. 5 is a flowchart showing an operation of the information management system. Since the second embodiment is substantially equal to the first embodiment in the configuration and the function, only the operation of the second embodiment will be described. Description of the configuration thereof will be avoided.

In the second embodiment, as in the first embodiment, the light emitter (not shown) emits light onto the RF tag 1 (step S201). As a result, while the sensor value of the tag 1 is at least m, the sensor value of the tag 2 is less than m. The reader-writer 3 sends a sensor value read command to all RF tags (step S202). The command includes the sensor reference value m.

The communication module 14 of the tag 1 receives the read command to send the command to the control module 12 (step S203). On receiving the command, the control module 12 reads an illuminance value from the sensor module 11 (step S204). The sensor 11 compares the illuminance value with the sensor reference value in the command (step S205).

Since light was emitted onto the tag 1, the illuminance value is equal to or more than m in the tag 1. Therefore, the controller 12 issues via the communication module 14 to the reader-writer 3 a response to the read command, the response including IDa which is the tag ID stored in the ID storage section 13 (step S206).

These operation steps are similarly carried out for the RF tag 2. That is, the communication module 24 of the tag 2 receives and sends the read command to the controller 22 (step S207). Having received the command, the controller 22 reads the illuminance value from the sensor module 21 (step S208). The controller 22 compares the illuminance value with the sensor reference value in the command (step S209). Since the light has not been emitted to the tag 2, the illuminance value is less than m in the tag 2. Therefore, the controller 22 does not reply to the read command (step S210).

Accordingly, the entity of the RF tag is identified on the basis of the recognition that the tag ID in the reply received by the reader-writer 3 is IDa (step S211). It is consequently determined that the tag ID of the RF tag selected as the target of the light emission is IDa.

Also, when the light emission target is the RF tag 2, the entity of the tag can be similarly determined. That is, it is determined that the entity of the tag of which the tag ID is IDb is the RF tag 2.

As above, in the second embodiment, when a plurality of RF tags each including a sensor is utilized, an entity of a tag corresponding to a tag ID can be easily identified. Moreover, in the operation to acquire the tag ID of the tag selected for light emission, traffic can be reduced.

Third Embodiment

According to a third embodiment, it is also possible for a control module in a RF tag reader-writer to control a reply to a command request. The controller 31 of the reader-writer 3 has a function to select an identifier (ID) to be set to a reply to a read command according to the result of the comparison between a sensor value in the reply command received from a tag and a sensor reference value.

Referring now to the drawings, description will be given of an operation of the third embodiment.

Figure 6:
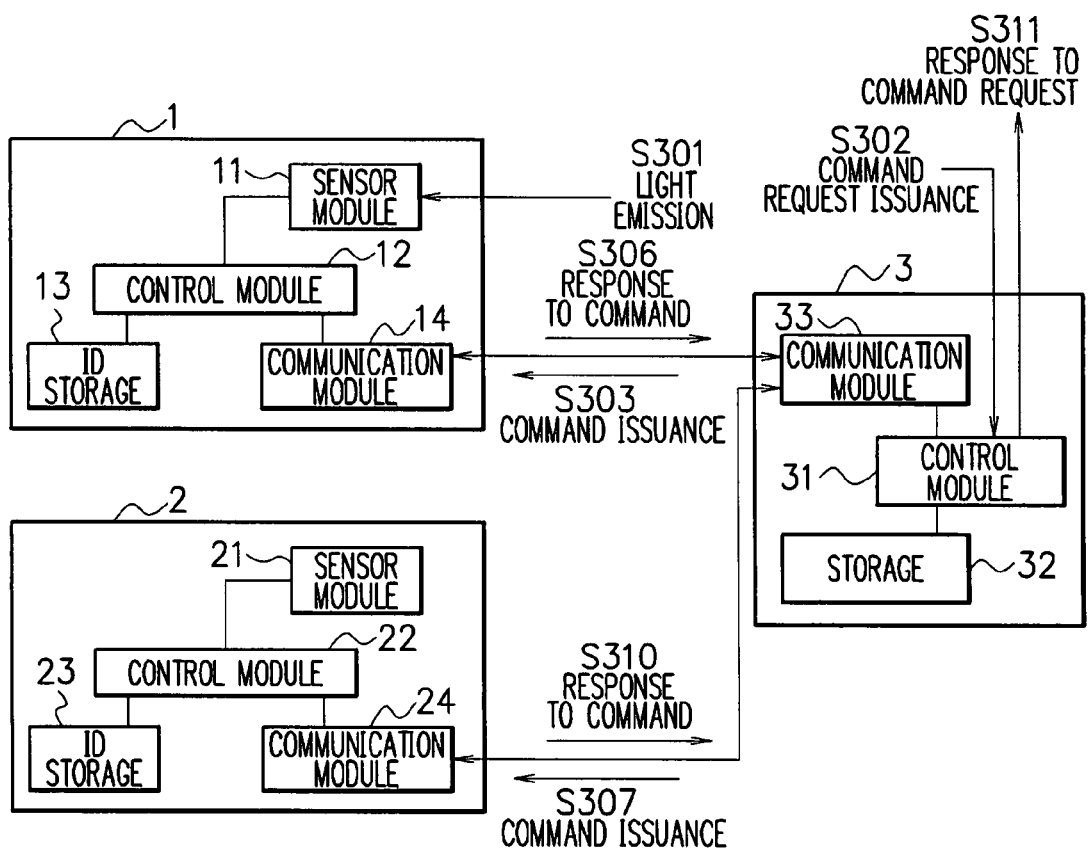
FIG. 6 is a block diagram showing a configuration of a third embodiment of an RF tag and an RF tag reader-writer.
Figure 7:
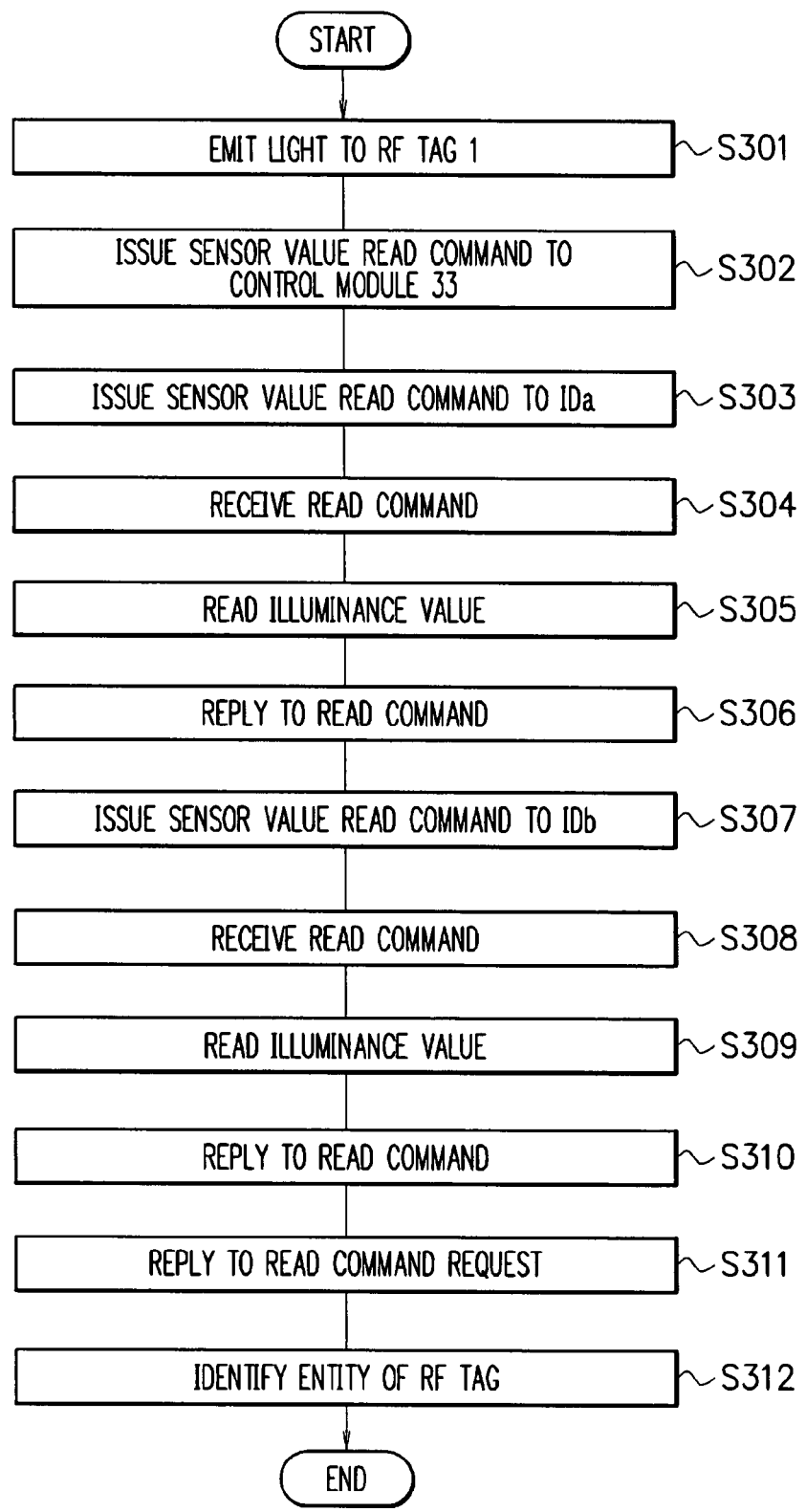
FIG. 7 is a flowchart showing operation of the RF tag and the RF tag reader-writer in the third embodiment.

FIG. 6 is a block diagram showing a configuration of an information management system. FIG. 7 is a flowchart showing operation of the third embodiment. Incidentally, the third embodiment is almost equal to the first embodiment in the configuration and the function. Therefore, only the operation of the third embodiment will be described, and description of the structure thereof will be avoided.

A light emitter (not shown) emits light onto the RF tag 1 as in the first embodiment (step S301). It is assumed that the illuminance value or the sensor value of each of the tags 1 and 2 is less than m before light is emitted. After the light is emitted, the sensor value of the tag to which the light has been emitted is at least m.

An external controller issues a sensor value read command including a sensor reference value m to the controller 31 of the reader-writer 3 (step S302).

According to the request, the reader-writer 3 sends a sensor value read command addressed to the tag ID "IDa" (step S303). The controller 14 of the RF tag 1 receives and delivers the command to the controller 12 (step S304). The controller 12 receives the command and confirms that the unique ID of the tag 1 stored in the ID storage section 13 is IDa and then reads an illuminance value from the sensor module 11 (step S305). The illuminance value is fed as a reply to the read command via the communication module 14 to the reader-writer 3 (step S306).

The above operation steps are similarly conducted for IDb. That is, the reader-writer 3 sends a sensor value read command to IDb to read a sensor value (step S307). The communication module 24 of the tag 2 receives and sends the command to the controller 22 (step S308). On receiving the command, the controller 22 confirms that the ID unique to the tag 2 in the ID storage section 23 is IDb, and reads an illuminance value from the sensor 21 (step S309). The illuminance value is delivered as a response to the read command via the communication module 24 to the reader-writer 3 (step S310).

As a result of the light emission from a light emitter, the sensor value of the tag 1 in the response to the command is equal to or more than m. On the other hand, the sensor value from the tag 2 to which light has not been emitted is less than m. Therefore, the illuminance value for IDa is at least m and the value for IDb is less than m.

Using the combinations of the tag IDs and the illuminance values thus obtained, the control module 31 of the reader-writer 3 selects IDa as a reply item to the sensor value read command and issues a response including IDa (step S311). The entity of the pertinent RF tag can be identified using the results and the tag ID of each RF tag (step S312).

Also, if the tag 2 is selected as the target of light emission, it is possible to determine, as in the operation of the RF tag 1, that the entity of the RF tag having IDb as its tag ID is the RF tag 2.

In accordance with the third embodiment described above, when a plurality of RF tags each including a sensor is employed, an entity of a tag corresponding to a tag ID can be easily identified. Furthermore, the traffic of the communication to obtain a tag ID of the selected tag can be advantageously reduced.

Fourth Embodiment

In a fourth embodiment, the RF tag may include a sensor value storage section to store a sensor value therein. In addition to the structure and the function of the second embodiment, the fourth embodiment includes a sensor value storage section to store sensor values at a point when an instruction is received from the RF tag reader-writer 3. According to a sensor value stored in the sensor value storage section and a sensor reference value contained in a sensor value read command received from the RF tag reader-writer 3, the system determines whether to reply to the command.

Next, description will be given of an operation of the fourth embodiment by referring to the drawings.

Figure 8:
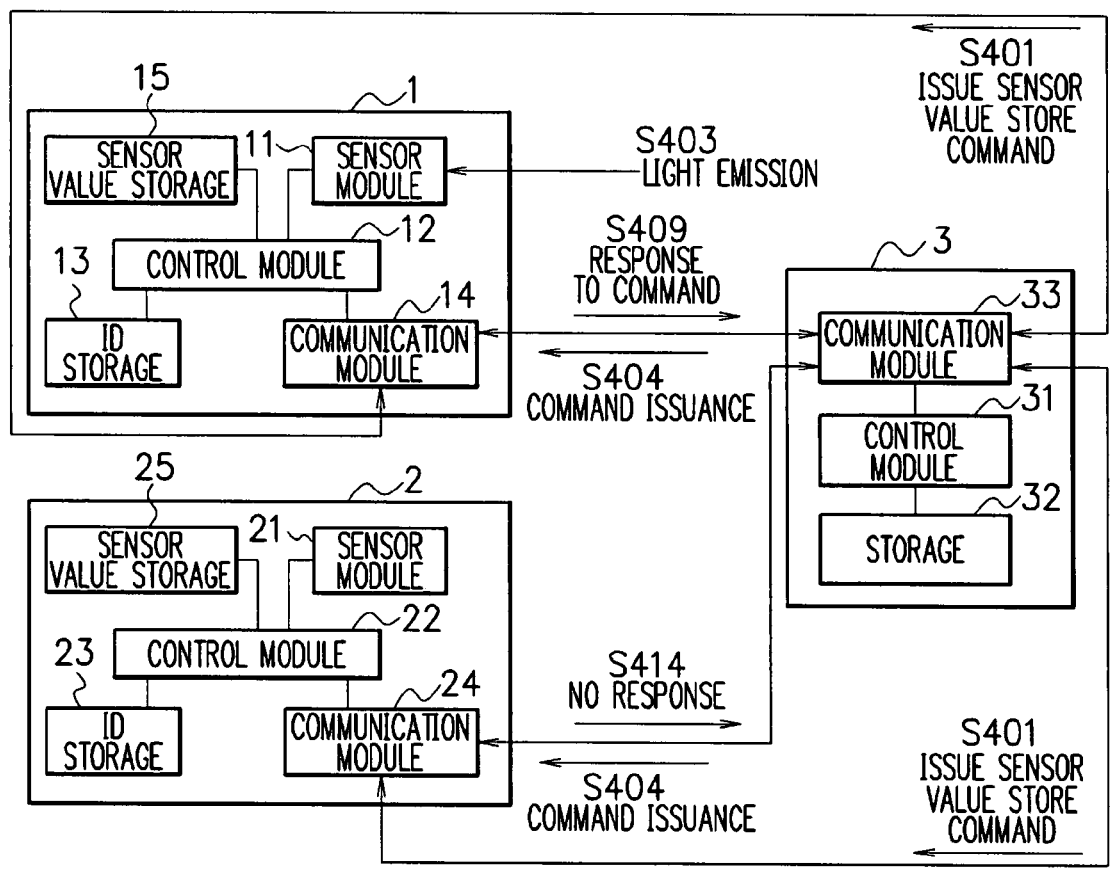
FIG. 8 is a block diagram showing a configuration of a fourth embodiment of an RF tag and an RF tag reader-writer.
Figure 9:
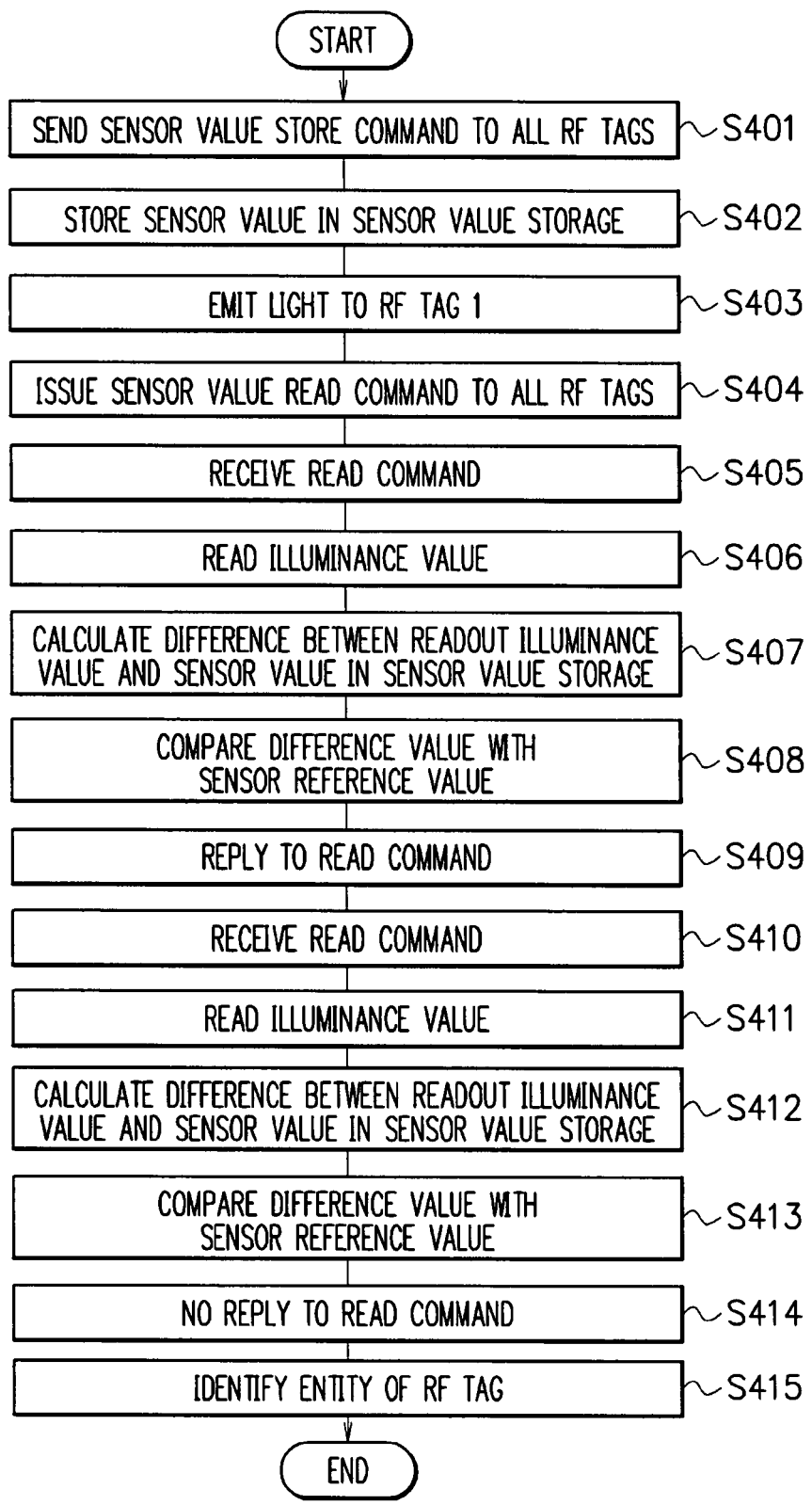
FIG. 9 is a flowchart showing operation of the RF tag and the RF tag reader-writer in the fourth embodiment.

FIG. 8 shows a block diagram showing a configuration of an information management system. FIG. 9 is a flowchart of an operation of the fourth embodiment. Since the fourth embodiment is almost equal in the configuration and the function to the second embodiment, only the operation will be described, and description of the structure thereof will be avoided.

First, the reader-writer 3 transmits a sensor value store command to all RF tags (step S401). It is assumed that the sensor value of the sensor module 11 of the tag 1 is nA and the value of the sensor module 21 of the tag 2 is nB at this moment. When the command is received, the tag 1 obtains the sensor value nA from the sensor 11 to store the value nA in the sensor value storage section 15 (step S402). Similarly, in the tag 2, the sensor value nB is acquired from the sensor module 21 and is then stored in the sensor value storage section 25.

Subsequently, a light emitter (not shown) emits light onto the tag 1 (step S403). It is assumed that as a result of the light emission, the sensor value of the tag 1 is equal to or more than nA+m and the value of the tag 2 to which light was not emitted is less than nB+m.

The reader-writer 3 sends a sensor value read command including a sensor reference value m to all RF tags (step S404). The communication module 14 of the tag 1 receives and delivers the command to the controller 12 (step S405). The controller 12 having received the command reads an illuminance value from the sensor module 11 (step S406).

The controller 12 then calculates the difference between the illuminance value from the sensor 11 and the sensor value (nA) stored in the sensor value storage section 15 (step S407). The controller 12 compares the difference value with the sensor reference value m in the read command (step S408).

Since light has been emitted to the tag 1, the difference value is equal to or more than m. Therefore, the controller 12 delivers via the communication module 14 to the reader-writer 3 a reply to the read command, the reply including IDa which is the tag ID stored in the ID storage section 13 (step S409).

The operation conducted for the tag 1 is similarly carried out for the tag 2. The communication module 24 of the tag 2 receives and sends the sensor value read command to the controller 22 (step S410). On receiving the command, the controller 22 acquires an illuminance value from the sensor module 21 (step S411). The controller 22 then calculates the difference between the illuminance value obtained from the sensor 21 and the sensor value (nB) stored in the sensor value storage section 25 in step S402 (step S412). The controller 12 compares the difference value with the sensor reference value m in the read command (step S413). Since light was not emitted to the tag 2, the difference value is less than m and hence the controller 12 does not send any reply to the reader-writer 3 (step S414).

The tag ID contained in the reply received by the reader-writer 3 is IDa. Thus the entity of the RF tag is identified (S415). That is, the system can identify that the ID of the RF tag selected as the target of light emission is IDa.

Additionally, if the tag 2 is selected as the target of light emission, it is also possible to determine, as in the operation of the RF tag 1, that the entity of the RF tag having IDb is the RF tag 2.

In accordance with the fourth embodiment, in a system configuration where a plurality of RF tags each including a sensor is used, it is possible to easily identify an entity of a tag corresponding to a tag ID. In addition, the load imposed on the communication to obtain the tag ID of the selected tag can be reduced. Also, it is possible to easily change a physical condition to obtain a tag ID of a tag.

As above, according to the fourth embodiment, it is possible to designate a condition for a sensor value to determine an operation of a tag through a control module in an RF tag including a sensor. As a result, by designating a condition of a sensor value from an external device such as an RF tag reader-writer, it is possible to flexibly and easily change a threshold value to identify a position. Further, the sensor's value may be recorded for a certain period of time to compute variations in the values and to use the variations as a condition for the system to identify a tag.

The present invention is applicable, for example, in a situation where positions of many objects stored in a warehouse are to be determined. By disposing an RF tag disclosed in the embodiments on each of the objects, the position of each object can be readily identified as below. After light was emitted from a light emitter, the position of each object including the RF tag can be easily determined using an illuminance value of an RF tag including a unique tag ID. In this way, for a plurality of RF tags that are selected as targets of light emission and to which light was emitted, the entity of each RF tag can be identified according to the sensor value by combining the tag ID and the sensor value or the illuminance value. The embodiments located a tag but are applicable in various fields.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An information management system comprising:
   one or a plurality of radio frequency (RF) tags;
   a reader-writer; and
   a device that changes an environment of at least one RF tag selected from the RF tags, wherein the RF tags and the reader-writer communicate with each other,
   each RF tag comprises:
      a sensor that detects a change in the environment of the RF tag;
      a storage section that stores identifier information identifying the RF tag, the information being uniquely assigned to the RF tag; and
      a first control section that controls the sensor and the storage section; and
   the reader-writer comprises a sensor value requesting section that requests, with respect to the identifier information, a sensor value detected by the sensor,
   the reader-writer identifies the selected RF tag according to the sensor value sent from the selected RF tag including the identifier information to the reader-writer.

2. The information management system in accordance with claim 1, wherein: the reader-writer further comprises a sensor reference value transmitting section that transmits, in response to a request from the sensor value requesting section, a sensor reference value; the RF tag comprises a first sensor value comparing section that compares the sensor value detected by the sensor with the sensor reference value; and the first control means decides, according to a result of the comparison, whether to reply to the reader-writer.

3. The information management system in accordance with claim 1, wherein the reader-writer issues, when the request includes the sensor reference value, the request for the sensor value to all RF tags.

4. The information management system in accordance with claim 1, wherein the reader-writer comprises a communicating section that communicates information with an external device other than the RF tags, and a second control section that controls the communicating section, the sensor value request section, and the sensor reference value transmitting section; and an object is recognized according to the sensor value for which a request is issued from the external device via the reader-writer with respect to the identifier information, and which is sent from the RF tag including the identifier information to the reader-writer.

5. The information management system in accordance with claim 4, wherein: the reader-writer comprises a second sensor value comparing section that compares the sensor value with the sensor reference value; and the second control section decides, according to a result of the comparison, whether to reply to the external device.

6. The information management system in accordance with claim 1, wherein: the RF tag further comprises; a sensor value storage section that stores the sensor value therein, a difference calculating section that calculates a difference value between the sensor value stored in the sensor value storage section before the environment is changed and the sensor value detected by the sensor after the environment is changed, and a third sensor value comparing section that compares the difference value with the sensor reference value sent from the reader-writer; and the first control means decides, according to a result of the comparison, whether to reply to the reader-writer.

7. An information management method for a system comprising one or a plurality of RF tags and a reader-writer, the RF tags and the reader-writer communicating with each other, the method comprising the steps of:
   changing an environment of at least one RF tag selected from the RF tags by a device;
   detecting a change in the environment by a sensor disposed in the RF tag;
   requesting by the reader-writer for a sensor value detected by the sensors in the RF tag that is designated with identifier information;
   transmitting, in response to a request from the reader-writer, the sensor value from the RF tag possessing the identifier information; and
   identifying the selected RF tag by the reader-writer according to the identifier information and the sensor value sent from the selected RF tag.

8. The information management method in accordance with claim 7, further comprising the steps of: transmitting from the reader-writer a sensor reference value with the request for a sensor value; and comparing, when an RF tag receives the sensor reference value, the sensor value detected by the sensor with the sensor reference value, deciding whether to reply to the read-writer based on the a result of the comparison.

9. An information management method in accordance with claim 7, further comprising the step of sending the request for the sensor value with the sensor reference value to all RF tags.

10. An information management method in accordance with claim 7, further comprising the steps of communicating with an external device other than the RF tags, and controlling by the reader-writer communication between the reader-writer and the external device, a procedure of requesting the sensor value, and a procedure of sending the sensor reference value, wherein an object is identified according to the sensor value.

11. The information management method in accordance with claim 10, further comprising: comparing the sensor value thus replied with the sensor reference value; and deciding, according to a result of the comparison, whether to a reply to the external device.

12. The information management method in accordance with claim 7, further comprising: storing the sensor value in the RF tag; calculating, by the RF tag, a difference value between the sensor value before the environment is changed and the sensor value after the environment is changed, and comparing, by the RF tag, the difference value with the sensor reference value sent from the reader-writer; and deciding, according to a result of the comparison in the third sensor value comparison step, whether to reply to the reader-writer.

13. A computer-readable recording medium having computer program for use with an information system comprising one or a plurality of RF tags and a reader-writer, the RF tags and the reader-writer communicating with each other, the program causing a computer to perform the following:
   changing an environment of at least one RF tag selected from the RF tags by a device;
   detecting, in each of the RF tags, a change in the environment by a sensor disposed in the RF tag;
   requesting by the reader-writer for a sensor value detected by the sensor in the RF tag that is designated with identifier information;
   transmitting, in response to a request from the reader-writer, the sensor value from the RF tag possessing the identifier information; and
   identifying the selected RF tag by the read-writer according to the identifier information and the sensor value sent from the selected RF tag.

14. The computer program in accordance with claim 13, further causing a computer to perform the following: transmitting from the reader-writer a sensor reference value with the request for a sensor value; comparing, when the RF tag receives the sensor reference value, the sensor value detected by the sensor with the sensor reference value; and deciding, according to a result of the comparison, whether to reply to the reader-writer.

15. The computer program in accordance with claim 13, further causing a computer to send the request for the sensor value with the sensor reference value to all RF tags.

16. The computer program in accordance with claim 13, further causing a computer to perform the following: communicating with an external device other than the RF tags; controlling by the reader-writer communication between the reader-writer and the external device, a procedure of requesting the sensor value, and a procedure of sending the sensor reference value, wherein an object is identified according to the sensor value.

17. The computer program in accordance with claim 16, further causing a computer to perform the following: comparing the sensor value thus replied with the sensor reference value; and deciding, according to a result of the comparison, whether to a reply to the external device.

18. The computer program in accordance with claim 13, further causing a computer to perform the following: storing the sensor value in the RF tag; calculating, by the RF tag, a difference value between the sensor value before the environment is changed and the sensor value after the environment is changed; comparing, by the RF tag, the difference value with the sensor reference value sent from the reader-writer; and deciding, according to a result of the comparison, whether to reply to the reader-writer.

* * * * *